United States Patent Office 2,723,939
Patented Nov. 15, 1955

2,723,939
CURARIZING COMPOSITION

Julio C. Castillo, deceased, late of Westchester County, N. Y., by Helen Castillo, administratrix, New York, N. Y., and Arthur P. Phillips, New York, N. Y., assignors to Burroughs Wellcome & Co. (U. S. A.) Inc., a corporation of New York No Drawing. Application January 26, 1953, Serial No. 333,334

6 Claims. (Cl. 167—65)

This invention relates to new compositions having new and unexpected curare-like action. The new compositions are based upon the discovery that certain agents have a potentiating action on the curarizing action of succinyl choline. The latter agent is noted for its powerful curarizing activity but this is not of an extended nature. It has now been discovered that compounds of the formula

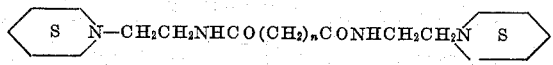

wherein $n$ is an integer having the value from 1 to 7 inclusive have a substantially prolonging effect on the activity of succinyl choline. This is quite surprising since the reagents themselves are essentially without curarizing action. This application is a continuation in part of application Serial No. 247,768 filed on September 21, 1951, now abandoned.

It was revealed in our copending application Serial No. 134,859 filed on December 23, 1949, now Patent No. 2,653,898, that tertiary aminoethyl dicarboxylic acid amides of the formula $$R_2NCH_2CH\ NHCO(CH_2)_nCONHCH_2CH_2NR_2 \quad II$$

and their bis quaternary salts had the surprising property of prolonging the curarizing action of succinyl choline while being themselves nearly devoid of such physiological activity.

In general the bis-quaternary salts are about twice as active as the corresponding di tertiary amines, but the differences are not marked. For example both bis N,N'($\beta$-dimethyl-aminoethyl) succinamide (Formula II, R=CH$_3$, $n$=2) and its bis methiodide prolong the curarizing action of 0.25 mg./kg. doses of succinyl choline in the cat by 100% when administered in 1–2 mg./kg. doses. Most surprisingly, however, the tertiary amino compounds of the present series are much more potent than either their own quaternary salts or than the typical examples of Formula II. N,N'bis ($\beta$-piperidinoethyl) succinamide (Formula I, $n$=2) accomplishes a 100% prolongation of the action of succinyl choline in a dose of 0.3 mg./kg. This effect is critical with the values of $n$ but only over a fairly broad range.

The compounds of the present invention are readily prepared by heating $\beta$-aminoethylpiperidine with the appropriate dimethyl or di-ethyl esters of dicarboxylic acids. The tertiary amino bases are solids that are easily recrystallized. They are soluble in water but are easily crystallized from organic solvents. They are conveniently administered by neutralizing their aqueous solutions with an acid such as hydrochloric acid. In the doses employed the nature of the acid is of no consequence wherefore we consider all salts with non-toxic acids to be embraced in the invention and to be equivalents of each other and of the parent bases.

The following detailed examples illustrate the method of preparation:

N,N'-bis-($\beta$-piperidinoethyl) succinamide

A mixture of 17.4 g. of ethyl succinate and 27 g. of aminoethylpiperidine was refluxed for 15 hours in a metal bath at 180° C. After removal of excess amine and alcohol in vacuo the residue crystallized on cooling. When recrystallized from ethyl acetate 30 g. of white crystals was obtained; M. P. 150–151° C.

N,N'-bis-($\beta$-piperidinoethyl) pimelamide

A mixture of 19 g. of methylpimelate and 28 g. of aminoethylpiperidine was refluxed for 17 hours in a metal bath at 150° C. After removal of methanol and excess amine in vacuo, cooling gave a crystalline product. When recrystallized from ethyl acetate 36 g. of white crystals of M. P. 120–121° C. resulted.

By the same method were prepared N,N'-bis($\beta$-piperidinoethyl) glutaramide, adipamide, malonamide, suberamide and azelaamide which melt respectively at 134–135° C., 140—141° C., 102–103° C., 138–139° C., and 116–117° C.

The dosage of these derivatives required to double the period of action for succinyl choline is shown in the following table.

| Compound | $n$ | M. P., °C. | Dose (mg./kg. cat) required to double the period of action of succinyl choline |
|---|---|---|---|
| N,N'-bis-($\beta$-piperidinoethyl) malonamide | 1 | 102–3 | 1.0 |
| N,N'-bis-($\beta$-piperidinoethyl) succinamide | 2 | 150–151 | 0.3 |
| N,N'-bis-($\beta$-piperidinoethyl) glutaramide | 3 | 134–135 | 0.1 |
| N,N'-bis-($\beta$-piperidinoethyl) adipamide | 4 | 140–141 | 0.1 |
| N,N'-bis-($\beta$-piperidinoethyl) pimelamide | 5 | 120–121 | 0.1 |
| N,N'-bis-($\beta$-piperidinoethyl) suberamide | 6 | 138–139 | 0.1 |
| N,N'-bis-($\beta$-piperidinoethyl) azelaamide | 7 | 116–117 | 1.0 |

It will be appreciated that the amide may be administered in admixture with the succinyl choline or consecutively and if desired the preparation may be compounded as a mixture. The separate administration is regarded as an equivalent to the conjunctive administration of the pharmaceutical preparation.

What is claimed is:

1. A pharmaceutical composition comprising succinyl choline and a compound of the formula

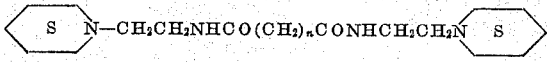

wherein $n$ is an integer from 1 to 7 inclusive.

2. As a pharmaceutical composition succinyl choline and N,N'-bis-($\beta$-piperidinoethyl) succinamide.

3. As a pharmaceutical composition succinyl choline and N,N'-bis-($\beta$-piperidinoethyl) glutaramide.

4. As a pharmaceutical composition succinyl choline and N,N'-bis-($\beta$-piperidinoethyl) adipamide.

5. As a pharmaceutical composition succinyl choline and N,N'-bis-($\beta$-piperidinoethyl) pimelamide.

6. As a pharmaceutical composition succinyl choline and N,N'-bis-($\beta$-piperidinoethyl) suberamide.

References Cited in the file of this patent
UNITED STATES PATENTS 2,438,200     Behr et al.     Mar. 23, 1948

OTHER REFERENCES

De Beer et al.: Annals, New York Academy of Science, vol. 54, art. 3, October 1951, pp. 362–372.